United States Patent [19]

Friesen

[11] Patent Number: 5,657,090
[45] Date of Patent: Aug. 12, 1997

[54] CIRCUIT ARRANGEMENT FOR THE DIGITAL IDENTIFICATION OF A TRANSMISSION STANDARD

[75] Inventor: Viktor Friesen, Obereisesheim, Germany

[73] Assignee: Temic Telefunken microelectronic GmbH, Heilbronn, Germany

[21] Appl. No.: 400,587

[22] Filed: Mar. 8, 1995

[30] Foreign Application Priority Data

Mar. 23, 1994 [DE] Germany ............ 44 10 008.6

[51] Int. Cl.⁶ ............................................. H04N 5/46
[52] U.S. Cl. ............... 348/558; 348/557; 348/543; 348/638; 348/727
[58] Field of Search ...................... 348/558, 555, 348/507, 638, 726, 727, 542, 543, 554, 557; H04N 5/46, 9/45, 9/455, 9/66, 5/455, 3/27

[56] References Cited

U.S. PATENT DOCUMENTS

| | | | |
|---|---|---|---|
| 4,240,102 | 12/1980 | Groeneweg . | |
| 5,267,024 | 11/1993 | Murayama | 348/638 |
| 5,339,111 | 8/1994 | Park | 348/555 |

FOREIGN PATENT DOCUMENTS

| | | |
|---|---|---|
| 0014027A1 | 8/1980 | European Pat. Off. . |
| 0063961A2 | 11/1982 | European Pat. Off. . |
| 0143373A3 | 7/1985 | European Pat. Off. . |
| 0245038A2 | 11/1987 | European Pat. Off. . |
| 0332252 | 9/1989 | European Pat. Off. . |
| 0441723A1 | 8/1991 | European Pat. Off. . |
| 0482768A2 | 4/1992 | European Pat. Off. . |
| 0453037A3 | 5/1992 | European Pat. Off. . |
| 0529442A2 | 3/1993 | European Pat. Off. . |
| 2943271 | 5/1981 | Germany . |
| 3137447 | 7/1982 | Germany . |
| 3808830 | 9/1989 | Germany . |
| 4210380 | 2/1993 | Germany . |
| 4233368 | 4/1993 | Germany . |
| 4223257 | 1/1994 | Germany . |
| 5211657 | 8/1993 | Japan . |
| 428575 | 2/1975 | U.S.S.R. . |

*Primary Examiner*—Sherrie Hsia
*Attorney, Agent, or Firm*—Spencer & Frank

[57] ABSTRACT

A circuit arrangement for the digital identification of television transmission standards, particularly PAL, SECAM and NTSC. Provision is made for transmission standard demodulation stages connected in parallel to which a signal composed of a chromaticity signal and a synchronizing character is directed and which are each cyclically activated by control signals for a certain period of time. A trigger is also provided, together with an up-down counter, a circuit arrangement for the evaluation of the value delivered by the up-down counter, and a control logic.

7 Claims, 3 Drawing Sheets

CIRCUIT ARRANGEMENT FOR THE DIGITAL IDENTIFICATION OF A TRANSMISSION STANDARD

BACKGROUND OF THE INVENTION

The invention relates to a circuit arrangement for the digital identification of transmission standards, in particular PAL, SECAM and NTSC.

Multi-standard receiving circuits are known and are used, in the first instance, in areas where multiple transmission standards can be received simultaneously. In the second instance, receivers which are technically capable of receiving multiple transmission standards are sold worldwide in the same configuration and are only adapted to the corresponding transmission standard on a local basis. However, multi-standard receivers of this type often possess the disadvantage that the desired transmission standard must be adjusted manually or even that the receiving circuit is designed as standard for a certain transmission standard, and must then be expanded to receive other or further transmission standards by means of an additional circuit, generally in the form of a plug-in module.

SUMMARY OF THE INVENTION

The object of the invention is to provide a circuit arrangement for the digital identification of a transmission standard which automatically identifies the incoming transmission standard and automatically converts the chroma processor to the corresponding operating mode.

According to the invention, there is a circuit arrangement having the following characteristics:

Transmission standard demodulation stages, connected in parallel, are provided, to which a signal consisting of a chromaticity signal and a synchronizing character is directed, and which are activated cyclically by control signals for a certain period of activation in each case.

A trigger with a first and second output is provided to which, as the input signal, the burst signals derived from the output signals of the demodulation stages are directed, whereby these outputs each deliver a pulse string as a function of the voltage level of the input signal, so that a change of level then takes place at the first or second output when the voltage level of the input signal exceeds a positive threshold value or falls below a negative threshold value.

An up-down counter is provided, of which the upward counting input receives the pulse string delivered by the first output of the trigger and the downward counting input receives the pulse string delivered by the second output of the trigger, and which delivers a counted value as a function of the recently activated demodulation stage, and A circuit arrangement is provided for the identification of the transmission standard by reference to the counted value delivered to it, in that after each period of activation and as a function of the counted value, control signals are delivered to activate the demodulation circuit of a control logic circuit corresponding to the transmission standard identified.

The particular advantages of the invention are that the circuit arrangement can be operated without compensation in conjunction with the demodulation circuit registered under reference No. DE 42 23 257.0-35, and that no external circuit elements are required.

BRIEF DESCRIPTION OF THE DRAWINGS

The invention is described below with reference to the accompanying drawings, wherein.

DESCRIPTION OF THE PREFERRED EMBODIMENTS

A transmission standard signal FS, composed of a chromaticity signal F and a synchronising character S, which contains for identification purposes a burst signal, and information relating to the phase of the auxiliary color carrier for the NTSC and PAL standard, together with information relating to the phase angle of an H/2 switch in the transmitter in the form of the line-to-line alternating phase of the auxiliary color carrier for the PAL standard, or in the form of the line-to-line alternating contraction frequency of the auxiliary color carrier for the SECAM standard, is simultaneously directed to demodulator circuits 1, 2 and 3 (PAL, SECAM and NTSC respectively). The output signals N1, N2 and N3 from a search counter 12 (FIG. 2) ensure that the demodulation circuits 1, 2 and 3 are activated and deactivated in succession for as long as no transmission standard is clearly identified. The activation and deactivation of the demodulation circuits is represented in FIG. 1 by the switches S1, S2 and S3 relating to their respective demodulators 1, 2, 3.

Figure 1:
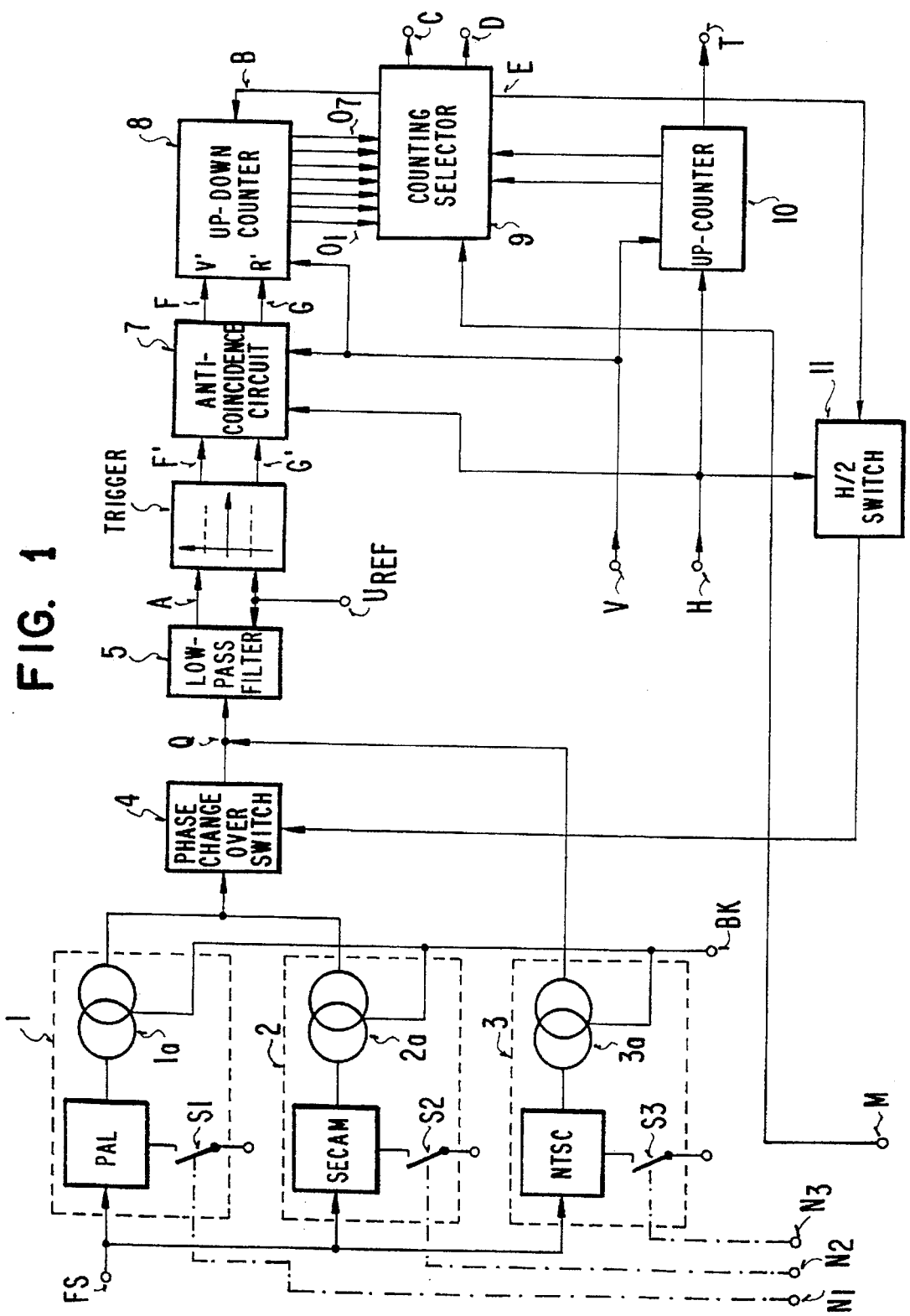
FIG. 1 shows a block diagram of the digital transmission standard identification circuit.
Figure 2:
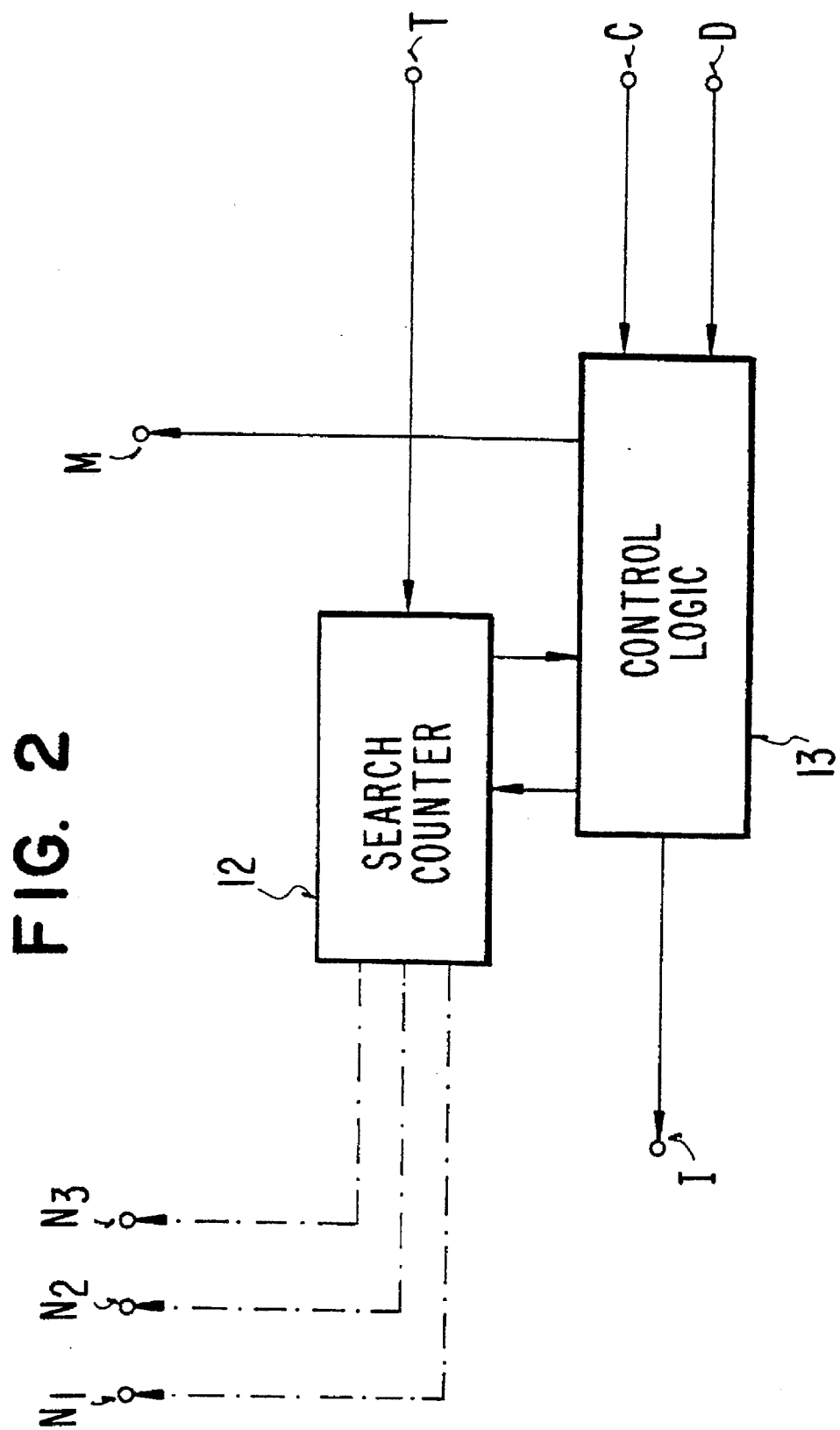
FIG. 2 shows a block diagram of the control logic and search counter.

A newly active demodulation circuit 1, 2 or 3 emits a current as the output signal which is represented in FIG. 1 by the controlled current sources 1a, 2a and 3a connected downstream of the respective demodulation circuits. Each of the demodulation circuits 1, 2 and 3 is activated for only a brief period, the duration of which is determined by the pulse width of the burst key pulse Bk derived from the synchronous line pulses.

As a result, during this time, a current level corresponding to the state of the burst signal occurs at the output of the demodulator 1, 2 or 3 recently activated by the search counter 12 through the demodulation of the burst signal while, at the output from the respective demodulator, a current pulse string is produced with alternating line-to-line polarity for PAL and SECAM transmission standards and a constant polarity, depending on the layout of the identification circuit, for the NTSC transmission standard. The alternating polarity of the current pulses takes place in synchrony with the change in the phase angle of the H/2 switch in the transmitter.

The output current pulse string from each PAL and SECAM demodulation circuit 1, 2 is then directed to a phase changeover switch 4, which is controlled by the H/2 switch 11 (in the receiver) and which delivers a current pulse string of positive polarity when the H/2 switch 11 (of the receiver) is in synchrony with the H/2 switch at the transmitter and the chromaticity signal F corresponds to the demodulator circuit recently activated by the counter 12. If neither the transmission standard nor the phase angle of the H/2 switch 11 in the receiver coincides with those of the transmitter, the phase changeover switch 4 delivers positive and negative current pulses alternately.

The number of current pulses within a vertical period depends on the aforesaid conditions and the respective transmission standard (maximum approx. 300 with PAL and SECAM, 250 with NTSC).

The H/2 switch 11 is triggered by a horizontal blanking signal H, derived from the synchronous line signal, and delivers a control signal at half the pulse duty factor and half the line frequency (15.625 Hz: 2=7.812.5 Hz), the phase angle of which can be adjusted by 180 degrees, if the phase switch 4 delivers only negative current pulses and/or the number of negative current pulses exceeds a certain value.

At point Q of the circuit, the phase adjusted output current from the phase changeover switch 4 and the output current from the NTSC demodulation circuit 3 are led to a low-pass filter 5 at which the voltage pulse string required as the input signal from a trigger 6 drops out.

The low-pass filter 5 retains the high frequency elements of the signal lying at circuit point Q, i.e., double the carrier frequency. The voltage pulses needed to evaluate the received transmission standard are able to pass the low-pass filter 5 in order to be directed to the trigger 6. The trigger 6 requires a constant direct voltage as reference in order to generate a positive and negative internal threshold. This is provided externally and directed to it as reference voltage U Ref. The trigger 6 possesses a very high open-circuit gain in order to direct square-wave voltage pulses to its outputs F' and Q'. Which of the two outputs F' or G' receives a voltage pulse depends on whether the signal at circuit point A exceeds the positive threshold value of the trigger 6, i.e., whether the correct demodulation circuit 1, 2 or 3 has been activated and is synchronized with the phase angle of the H/2 switch 11, or is below its negative threshold, i.e., with the correct demodulation circuit but an incorrect phase synchronization of the H/2 switch 11. Typically, a voltage pulse is always directed to output F' when the signal at circuit point A exceeds the positive threshold of trigger 6. In this case, output G' receives a voltage pulse accordingly when the signal at circuit point A is below the negative threshold of the trigger 6.

Figure 3:
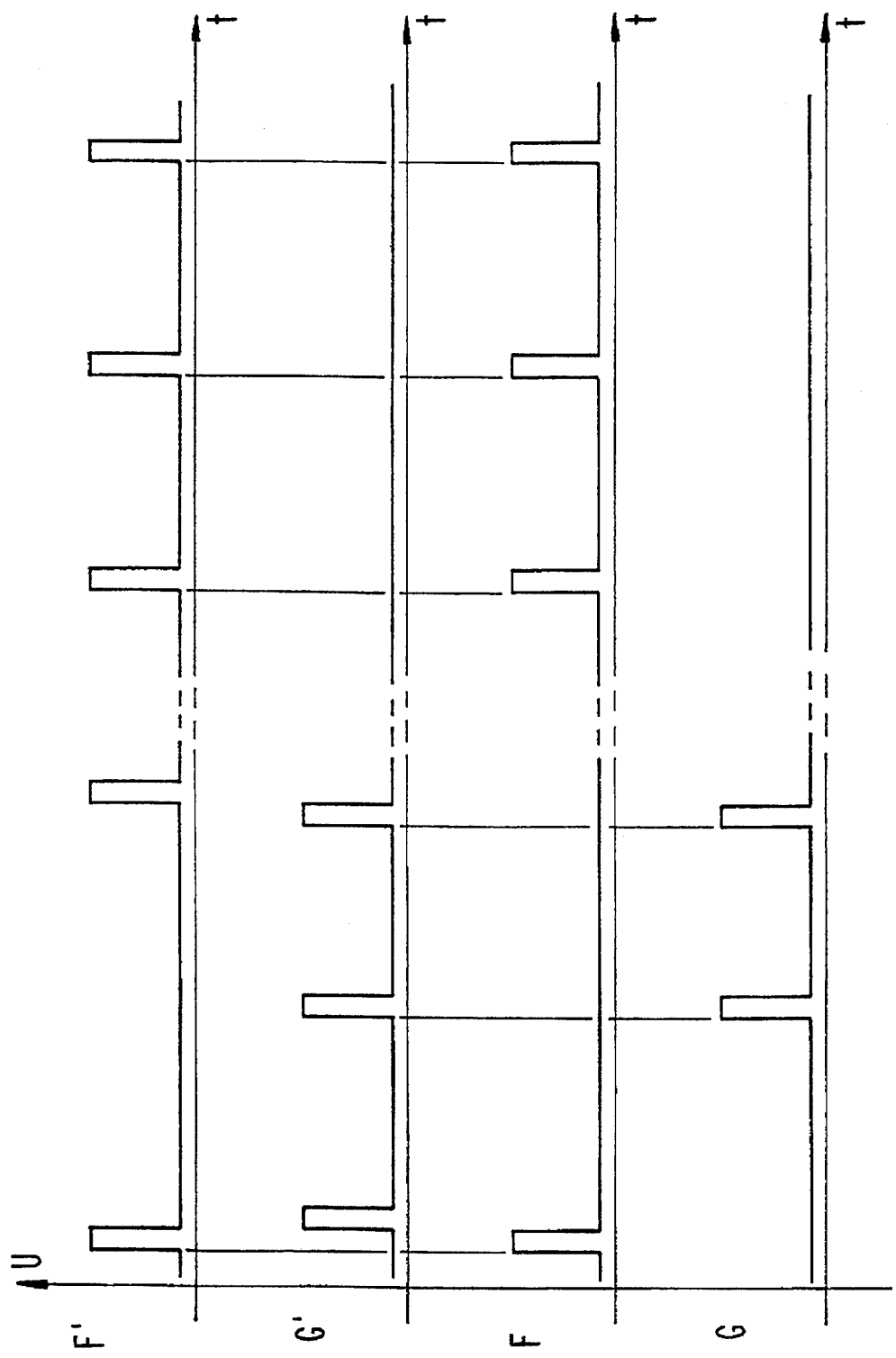
FIG. 3 represents the signal progressions upstream and downstream of the circuit arrangement for coincidence suppression.

In principle, the voltage pulses at the two outputs F' and G' of the trigger 6 could be used to evaluate the received transmission signal, but the interference voltages superimposed on the useful signal at circuit point A could present difficulties in the evaluation of the signal and thus in the identification of the transmission standard received. For this reason, the voltage pulses at the outputs F' and G' of the trigger 6 are directed to a circuit arrangement for coincidence suppression, the so-called anti-coincidence circuit 7. This performs the function of directing a voltage pulse to its output F or G during a horizontal blanking signal only at the first overshoot or undershoot of the positive or negative threshold, and of not reacting to any further input signals, as shown in FIG. 3. This is intended to prevent a downstream up-down counter 8 from receiving upward and downward pulses simultaneously within 2 consecutive blanking gaps, thus rendering impossible the identification of the transmission standard received. This situation will arise, e.g.,if the multi-standard receiver is working in the SECAM mode and receives PAL signals. For the anti-coincidence circuit 7 to operate, the video blanking signals H and V must be directed to it as control signals for synchronization. Its output signals F and G are directed to the two inputs of the downstream up-down counter 8 in such a way that the counter status is incremented by 1 when signal A in the trigger 6 exceeds the positive threshold value, and decremented by 1 when signal A in the trigger 6 falls below the negative threshold value. The seven highest-valued bits of the 9-bit up-down counter 8 are directed to the counting selector 9 and evaluated at a specific time which is determined via lead B of the up-counter 10. The up-down counter 8 is stopped during the period of evaluation. The result of the evaluation (PAL and SECAM or NTSC 4.4 and NTSC 3.5) is present at outputs C and D.

A further control signal from the counting selector 9 is directed to the H/2 switch 11 by means of connection E. This serves for the phase adjustment which is carried out when the counting selector 9 has registered a certain number of negative counting pulses within a vertical period. This signifies that, although a signal capable of evaluation is indeed present at circuit point A, the phase angle of the H/2 switch 11 (in the receiver) does not coincide with the phase angle of the H/2 switch of the transmitter. The essential function of the counting selector 9 is to decide whether a chromaticity signal F capable of evaluation is present at the input to the identification circuit, and to which transmission standard, if applicable, it relates.

For this purpose, a second counter, the 9-bit up-counter 10, is used to which the video blanking signals V and H are directed for control purposes. This second counter 10 is programmed in such a way that a control signal is directed to the counting selector 9 at one of its 511 possible counting steps (e.g. step No. 211 for NTSC), whereupon it triggers the up-down counter 8 by means of a signal via connecting line B to terminate the counting process and output the result to the counting selector 9 byway of the data transfer lines 01 to 07.

The counter 10 directs clock pulses via a further connection T to a 4-bit search counter 12 (FIG. 2), which continues the search by way of demodulator switches S1, S2 and S3, for as long as no transmission standard has yet been identified.

By means of the value received by the up-down counter 8 in digital form from the data transfer lines 01 to 07, the counting selector 9 identifies whether a chromaticity signal F is present and whether the transmission standard corresponds to the recently activated demodulator. As soon as it has identified a transmission standard, the counting selector 9 directs control signals to a downstream control logic 13 (FIG. 2) by means of its outputs designated C and D. The 4-bit counter 12 controlling the search (FIG. 2) is then made to terminate the search and to allow the affected demodulator 1, 2 or 3 to be activated. A signal is directed to output J of the control logic 13, at which other circuit elements, e.g. the color killer, are able to recognize that a transmission standard has been identified. A message is passed to the counting selector 9 by way of data transfer line M as to whether the PAL or SECAM or NTSC demodulator has just been activated.

Since, in many cases, more than one transmission standard is available, it is preferable for the control logic 13 to be programmed to give priority to a specific transmission standard, in this case the PAL standard, over the SECAM standard.

What is claimed is:

1. Circuit arrangement for the digital identification of transmission standards, in particular the PAL, SECAM and NTSC transmission standards, said circuit arrangement comprising:

a) A plurality of transmission standard demodulation stages which are connected in parallel, to which a signal (FS) consisting of a chromaticity signal (F) and a synchronizing character (S) is directed, and which are activated cyclically by control signals for a certain period of activation (Δt) in each case;

b) A trigger with a first and a second output to which, as an input signal, burst signals (Bk) derived from the output signals of the demodulation stages are directed, whereby the first and second outputs each deliver a pulse string as a function of the voltage level of the input signal, so that a change of level then takes place at the first or second output when the voltage level of the input signal exceeds a positive threshold value (+U Ref) or falls below a negative critical value (−U Ref);

c) An up-down counter having an upward-counting input which receives the pulse string delivered by the first output of the trigger and a downward-counting input which receives the pulse string delivered by the second output of the trigger, and which delivers a counted value as a function of a most recently activated demodulation stage; and, d) circuit means, including a control logic circuit, for the identification of the transmission standard by reference to the counted value delivered by the up-down counter in that after each period of activation ($\Delta t$) as a function of the counted value, the control signals are delivered by the control logic circuit to activate the demodulation stage corresponding to the transmission standard identified.

2. Circuit arrangement according to claim 1, wherein a low-pass filter is connected upstream of the trigger to derive the burst signals (Bk) from the output signals of the demodulation stages.

3. Circuit arrangement according to claim 1, wherein an anti-coincidence circuit is connected downstream of the trigger.

4. Circuit arrangement according to claim 1, wherein the circuit means for identifying the transmission standard includes a counting selector with multiple outputs and a counter which controls said counting selector; wherein the counting period of the counter corresponds to the activation period ($\Delta t$); and wherein the control signals at the outputs from the counting selector are directed to the control logic circuit.

5. Circuit arrangement according to claim 4, wherein the circuit arrangement is configured for the transmission standards PAL, SECAM and NTSC; wherein a phase converter is connected downstream of the PAL and SECAM demodulation stages; and wherein the counting selector synchronizes the phase converter to the phase angle of an H/2 switch as the function of the counted value.

6. Circuit arrangement according to claim 4, wherein the control signals are generated by a search counter which is triggered by the control logic circuit such that the cyclical activation of the demodulation stages is stopped at a particular demodulation stage corresponding to the transmission standard identified by the counting selector.

7. Circuit arrangement according to claim 6, wherein the counter controlling the counting selector is connected to the search counter for the purpose of synchronizing the counting selector with the activation period ($\Delta t$) of the demodulation stages.

* * * * *